INVENTOR.
Bruce G. Barton

Nov. 24, 1964         B. G. BARTON         3,158,164
      MULTIPLE BLOCK FLUID DISTRIBUTION PANEL FOR MOUNTING FLUID
              CONTROL DEVICES AND METHOD OF DIRECTING
                  FLUID FLOW THROUGH THE BLOCKS
Filed Oct. 5, 1961                         4 Sheets-Sheet 2

INVENTOR.
Bruce G. Barton
BY Ralph W. McIntire, Jr.
Attorney

Nov. 24, 1964    B. G. BARTON    3,158,164
MULTIPLE BLOCK FLUID DISTRIBUTION PANEL FOR MOUNTING FLUID
CONTROL DEVICES AND METHOD OF DIRECTING
FLUID FLOW THROUGH THE BLOCKS
Filed Oct. 5, 1961    4 Sheets-Sheet 3
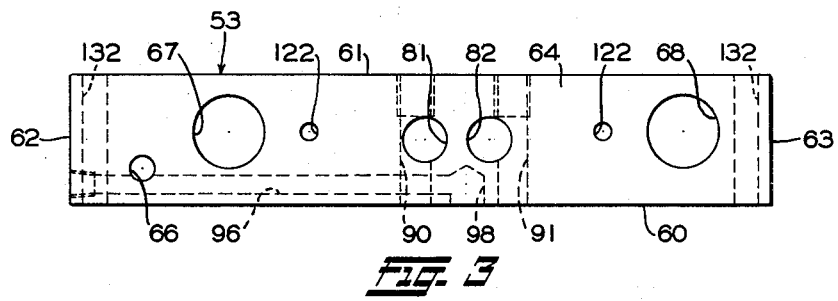
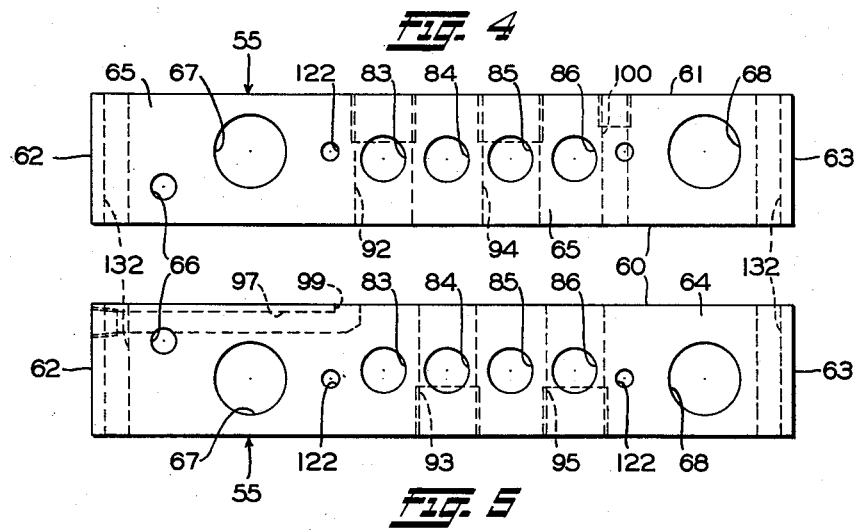
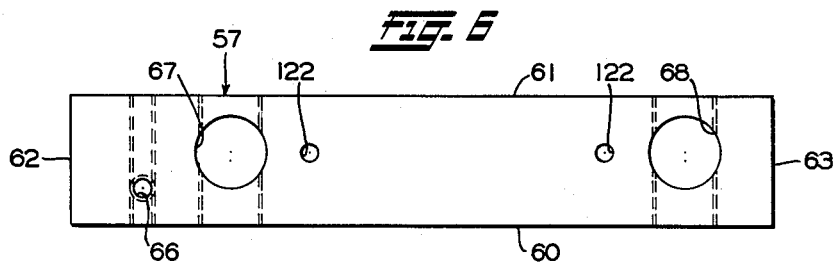
INVENTOR.
Bruce G. Barton
BY Ralph W. McIntire, Jr.
Attorney INVENTOR.
Bruce G. Barton
BY
Attorney

United States Patent Office 3,158,164
Patented Nov. 24, 1964

3,158,164
MULTIPLE BLOCK FLUID DISTRIBUTION PANEL FOR MOUNTING FLUID CONTROL DEVICES AND METHOD OF DIRECTING FLUID FLOW THROUGH THE BLOCKS
Bruce G. Barton, Livonia, Mich., assignor to Westinghouse Air Brake Company, Wilmerding, Pa., a corporation of Pennsylvania
Filed Oct. 5, 1961, Ser. No. 143,184
8 Claims. (Cl. 137—15)

This invention relates to fluid circuitry panels employed for connecting sources of fluid under pressure with various control valve devices, such as, check valves, feed valves, pressure limiting valves and the like, and, more particularly, to a multiple block fluid transmission panel adapted to mount fluid control valve devices.

Heretofore, it has been common practice in fluid pressure operated systems to individually mount the control valve devices at scattered locations, and to interconnect the control valve devices and the source of fluid pressure by individual sets of piping and tubing. Such fluid pressure operated systems have a high incidence of vibration because of the constant pulsation of the fluid under pressure associated with the supply and release of fluid from the valve devices. Such vibrations frequently effect loosening of the tubing at various connection points so as to cause leakage resulting in improper operation of the valve operated devices. The correction of such leakage oftentimes requires a considerable expenditure of time because of the decentralization of the piping connections and also because of the difficulty in checking the system.

To overcome these difficulties, I have proposed in my copending application, Serial No. 818,117, filed June 4, 1959, now abandoned to provide a fluid transmission panel assembly for rigidly mounting in a centralized location various control valve devices associated with operating valve devices, thus minimizing the quantity of tubing required to connect the control valve device with a common source of fluid pressure. To further minimize the use of tubing, which as above described oftentimes causes leakages, the panel assembly comprises a plurality of tandemly disposed blocks interconnected in fluid-tight relationship, each block being of a predetermined standard size and being provided with internally disposed fluid transmission channels arranged to communicate with the corresponding transmission channels in adjacent blocks so as to provide a common pressure line, a common return or tank line and a common drain line extending through the panel. The transmission channels are connected at one end of the panel to the primary source of fluid and to a tank by means of external tubing, and are connected at the other end of the panel by external tubing to the device to be operated. Each of the standard blocks is further provided with face openings communicating with the transmission channels, the openings being relatively disposed to mate with the various ports of conventional control valve devices mounted on the block face, the valves thereby to be actuated by the fluid under pressure being transmitted through the transmission channels.

These prior fluid transmission panel assemblies are satisfactory, but in their basic form are limited in versatility because of the lack of structure conveniently adaptable for altering the path of the fluid under pressure through the blocks to accommodate the panel to a wide variety of systems without resort to the use of external piping. When it is desired to modify the transmission path of the fluid under pressure through the various blocks, it is necessary to individually alter each standard block form by providing additional passageways and eliminating or blocking others, thus necessitating further work on each block before it may be employed in the fluid transmission panel assembly. This procedure of tailoring each block to suit a need in a particular system tends to minimize the standardization of the blocks, resulting in increased production costs.

In accordance with the present invention, it is proposed to provide an improved fluid transmission panel assembly of the type heretofore known, but incorporating therein a novel means to facilitate the transmission of the fluid under pressure through the blocks so that the blocks may be constructed to standards, and yet may readily be accommodated to a wide variety of systems in which the direction of the pressure transmission must be changed or transferred internally of the panel assembly. Briefly, this is accomplished by the provision of circuit blocks constructed such that the direction of fluid transmission is accomplished therein. The circuit blocks are constructed to standards, and, after a minimum of selective modification thereof are interposed between control valve mounting blocks so as to control the direction of the transmission of the fluid under pressure to and from valve communicating passages in the adjacent valve mounting blocks. These standardized circuit blocks are provided with internal passageways, or at least partially completed passageways, which subsequently may be selectively opened at various points to accommodate desired fluid flow from block to block in the panel assembly in accordance with the system requirements.

Further objects and features will hereinafter appear.
In the Figs.:

FIG. 3 is an end view of one of the standard valve mounting blocks of FIG. 2.

FIGS. 4 and 5 are end elevational views of the other standard valve mounting block of FIG. 2.

FIG. 6 is an end elevational view of one of the power entry blocks shown at the bottom of FIG. 2.

Figure 2:
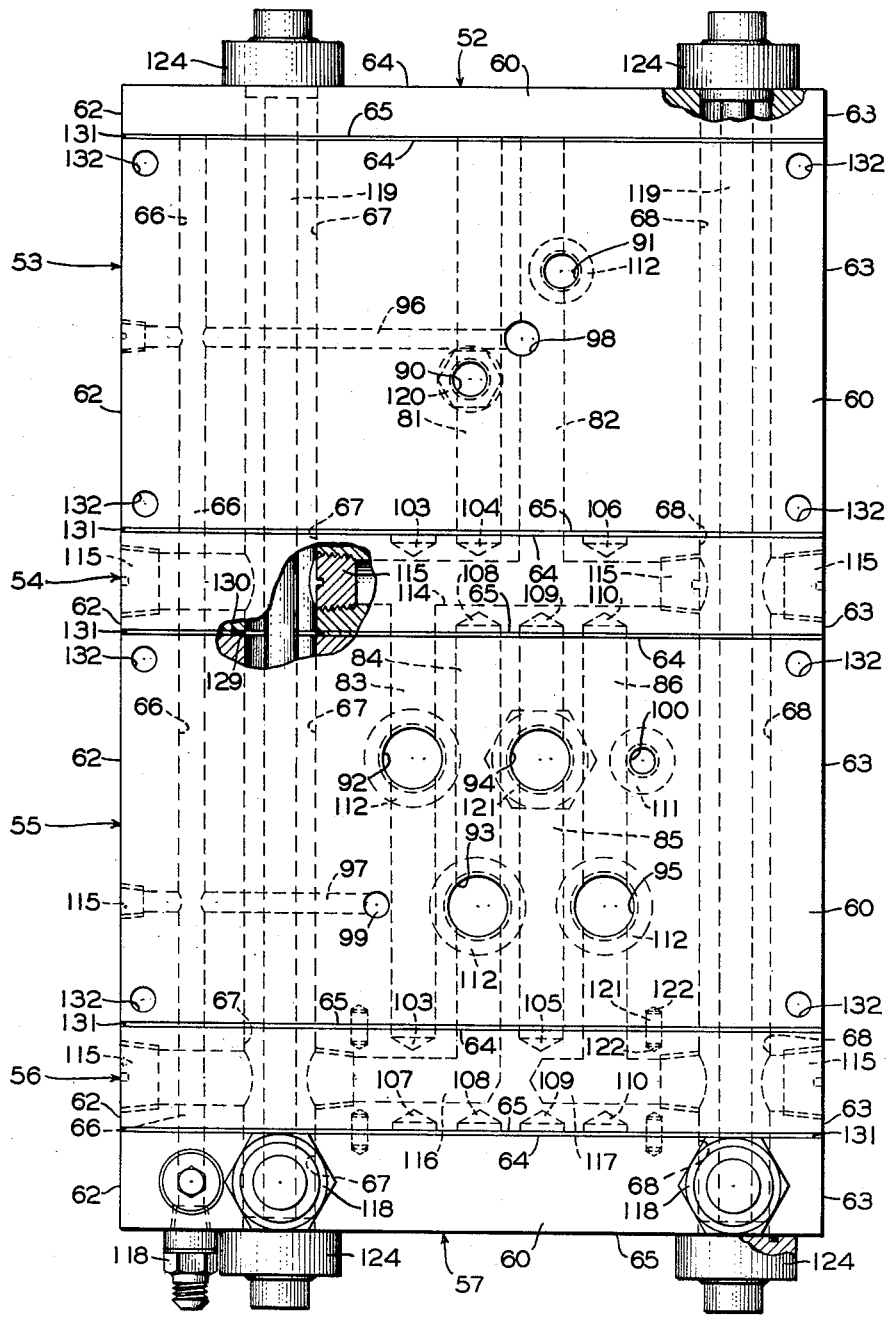
FIG. 2 is a side elevational view of a fluid transmission panel for the fluid pressure operated system shown in FIG. 1 and is formed of a plurality of valve mounting blocks and circuit blocks embodying the present invention.
Figure 7:
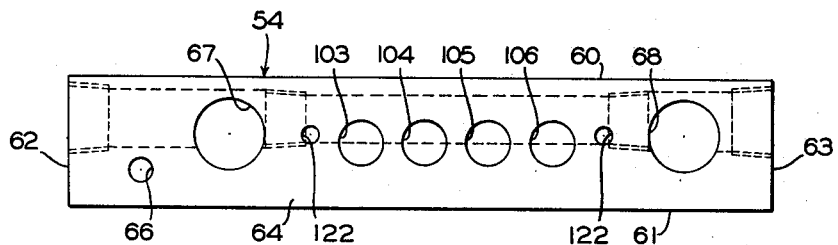
Figure 8:
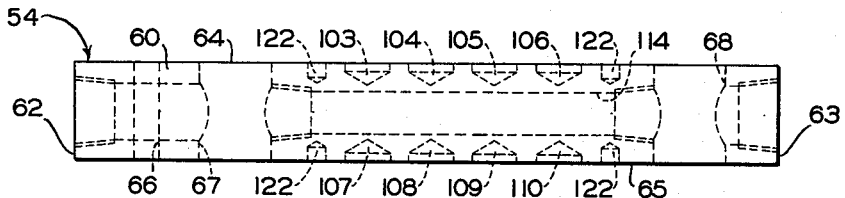

FIGS. 7 and 8 comprise a top plan and a side elevational view, respectively, of one of the standard circuit blocks shown in FIG. 2.

Figure 9:
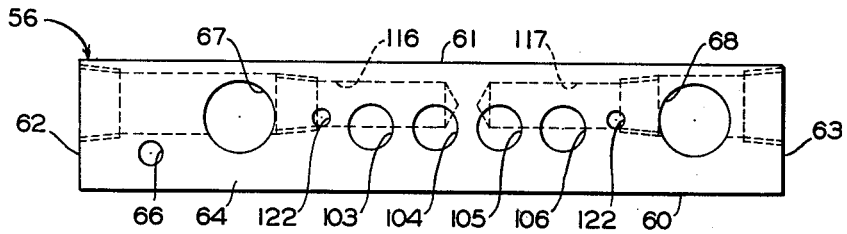
Figure 10:
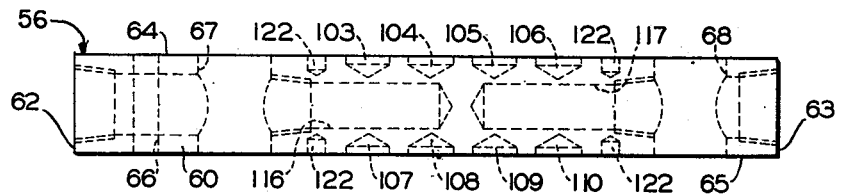

FIGS. 9 and 10 comprise a top plan and a side elevational view, respectively, of another type of standard circuit block as shown in FIG. 2.

Figure 1:
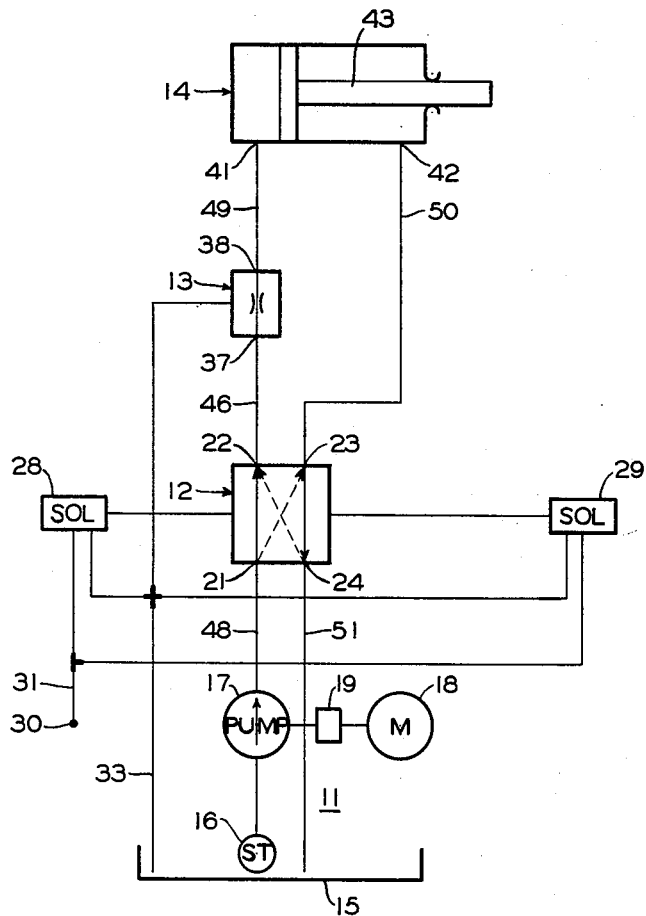
FIG. 1 is a schematic view of a fluid pressure system for operating a double acting power cylinder.

Referring now to FIG. 1, there is shown in schematic illustration a simple fluid pressure operated system which is disclosed, by way of example only, to demonstrate in a manner hereinafter described in detail, the versatility and adaptability of the fluid transmission panel of this invention for distributing and transmitting fluid pressure between and among the various elements of fluid distribution systems.

The fluid pressure system of FIG. 1 comprises a source of fluid pressure generally indicated at 11, directed and controlled by directional valve means generally indicated at 12 and flow control means generally indicated at 13, respectively, connected by means of suitable piping to operate a double acting cylinder generally indicated at 14.

The source of fluid pressure 11 comprises a fluid container or tank 15 containing fluid which is pumped through a strainer 16 by a pump 17, the pump 17 being driven by an electric motor 18 through appropriate reduction gearing 19.

The directional valve means 12 is a conventional two-position valve having four connections 21, 22, 23 and 24, which valve is pilot pressure operated as controlled by a pair of solenoids 28 and 29 in a conventional manner, wherein the directional flow of fluid internally of the valve, for the first and second positions, is shown in full lines, and in broken lines, respectively, the valve being operable to assume the first or second position depending upon the energization of one or the other of the solenoids 28, 29. The solenoids 28, 29 are connected to a single pilot pressure point 30 through a common line 31 and are connected to the tank 15 by a common drain line 33.

The flow control or regulating valve 13 is a conventional type and includes connections 37, 38 for connecting the valve in a pressure circuit, and is connected through drain line 33 to the tank 15.

The cylinder 14 may be of any conventional double acting type and includes a pair of connections 41, 42 for connecting the cylinder in circuit relationship with the above-described circuit element. A piston 43 is disposed for reciprocal motion within the cylinder in conventional manner.

The various elements of the pressure circuit, as described above, are connected in circuit relation by means of piping 48, connecting the output of pump 17 to connection 21 of valve means 12, piping 46 connecting the connection 22 of valve means 12 to connection 37 of the flow control valve 13, piping 49 between connection 38 of flow control valve 13 and connection 41 of cylinder 14, piping 50 between connection 42 of cylinder 14 and connection 23 of valve means 12, and piping 51 between connection 24 of valve means 12 and tank 15.

In the operation of the system of FIG. 1, the solenoids 28 and 29 are alternately operated in response to the operation of a handle or other suitable device as is known in the art. When solenoid 28 is energized to connect pilot pressure 30 to operate the valve 12 to the first position, as indicated in full lines, fluid pressure is provided from pump 17 through piping 48, through valve 12 from connection 21 to connection 22 thereof, piping 46 to flow valve connection 37, through flow valve 13 and flow valve connection 38 to piping 49, through cylinder connection 41 and into cylinder 14 to move piston 43 to the right. At the same time fluid in cylinder 14 is vented to cylinder connection 42 through piping 50 to directional valve connection 23, through directional valve 12 and valve connection 24, and through piping 51 to tank 15, thus effecting motion of piston 43 to the right of FIG. 1. When solenoid 29 is energized to connect pilot pressure 30 to operate the valve 12 to the alternate position shown in broken lines, the fluid pressure flow to the valve 12 from the pump 17 is the same as discussed above, but because of the different position of the valve 12, thereafter flows from valve connection 21 through valve 12 to valve connection 23, piping 50, connection 42, to cylinder 14 to effect movement of piston 43 to the left of FIG. 1. At the same time fluid is returned from the cylinder through piping 49, valve connection 38, valve 13, connection 37, piping 46, valve connection 22, through valve 12, to valve connection 24 and piping 51 to tank 15.

Referring now to FIG. 2 of the drawing, there is shown a fluid transmission panel assembly comprised of standard panel blocks having internal passageways connecting with one another to comprise substantially all the piping required to interconnect the various circuit elements of the circuit of FIG. 1 in the circuit relationship as above described, with the exception of additional external piping, as hereinafter described, required to connect the panel at its ends to the power cylinder 14, pump 17 and tank 15, the additional external piping being required only because of the remote location of these elements with respect to the panel assembly, per se.

The panel assembly comprises, from top to bottom of FIG. 2, a standard end block 52 for closing the passageway at the upper end of the assembly, a standard valve-mounting panel block 53 for receiving thereon a variety of commercially available two port valve devices and for communicating the valve ports to other adjacent panel blocks, a standard circuit block 54 for connecting passages in adjacent valve mounting blocks, a standard valve-mounting panel block 55 for receiving thereon any one of a wide variety of commercially available four-way valves and for connecting the valve ports to adjacent blocks, a standard circuit block 56 of different construction than standard circuit block 54, and a power entry block 57 for connecting the panel to the power supply and tank.

The blocks 52–57 are of the same length and thickness but are of different widths, the end blocks 52 and 57 and circuit blocks 54, 56 being considerably smaller in width than the valve-mounting blocks 53, 55, inasmuch as the former do not function as valve-mounting means, and thus do not require the large valve-mounting surface of the latter. The reduced width of the blocks 52, 54, 56 and 57 provides for compactness in the panel block assembly. Each of the blocks 52–57 is comprised of any suitable solid material having pressure sustaining properties, such as aluminum, and includes a front face 60, a rear face 61, ends 62, 63 and sides 64, 65. Each of the blocks, with the exception of end block 52, is provided along its length with three spaced, parallel, internal passages comprising, respectively, a drain passage 66, a pressure passage 67, and a return or tank passage 68. The spacing of each passage 66, 67, and 68 with respect to the others and with respect to the ends 62, 63 of the block is the same for each individual block to provide, upon tandem assembling of the blocks, continuous drain passage 66, continuous pressure passage 67, and continuous return passage 68, all extending the full width of the panel assembly.

Referring now particularly to valve-mounting panel blocks 53 and 55 of FIG. 2, it will be observed that in addition to the previously described passages 66, 67, and 68, there are provided spaced parallel internal passages comprising valve-port communicating passages, each extending the width of the block, the number of valve-port communicating passages in each block depending upon the number of ports in the valve device intended to be mounted thereon. Thus, in block 53, intended to mount a variety of commercially available two-port valve devices, such as flow regulators, relief valves, reducing valves and such, there are provided two valve communicating passages 81 and 82. Similarly, in block 55, which is intended to mount either three or four-way devices such as directional valves, and such, there are provided four valve communicating passages 83, 84, 85 and 86. The individual valve communicating passages communicate with the valves to be mounted thereon by means of holes or ports 90, 91 corresponding to the passages 81, 82, respectively, in block 53, and holes or ports 92, 93, 94 and 95, corresponding to passages 83, 84, 85 and 86, respectively, in block 55. The holes 90, 91 are aligned with the ports of the valve to be mounted on block 53, and are drilled from the front face 60 to the rear face 61, each hole intersecting the corresponding valve communicating passage internally of the block. The holes 90, 91 form on the face 60 of block 53, the subplate or pipe bracket of the valve to be mounted thereon, and are tapped on the rear face 61 for fitting to external piping or other devices. Similarly, holes 92–95 form a subplate for the valve to be mounted on front face 60 of block 55, and are tapped at the rear face 61 for fitting.

Each of the valve panel blocks 53, 55 is provided with auxiliary drain passages 96, 97, respectively, communicating at one end with the face 60 of the corresponding block at ports 98, 99, respectively, and extending internally transversely of the block in intersecting relationship with the drain passage 66 therein. The drain holes 96, 97, are disposed relative to the previously described valve port holes to mate with the drain port of the corresponding valve. An additional hole 100 is provided in block 55 to supply pilot pressure to the valve to be mounted thereon.

It is an important aspect of this invention to terminate each of the valve communicating passages, such as passages 81, 82 in block 53, and passages 83, 84, 85 and 86 in block 55, at one of a predetermined plurality of locations spaced along the sides 64, 65 of the individual blocks. The spacing of each location along the sides 64, 65 of the block with respect to the other passages in the block and with respect to the ends 62, 63 of the block is the same for all blocks, and for both sides of the individual blocks. The maximum number of valve communicating passages in any standard valve mounting block is four, therefore, each valve communicating passage in every valve mounting block terminates at the sides of the block at one of four such spaced locations. The reasons for aligning the openings of the valve communicating passages with passages at predetermined locations along the block sides will become readily apparent in the following description of the structure and function of the standard circuit blocks 54, 56 and their relationship with the valve mounting panel blocks 53, 55, and particularly with respect to the valve communicating passages therein.

Referring now particularly to FIGS. 7, 8, 9 and 10, there is shown in FIGS. 7 and 8 the standard circuit block 54 of FIG. 2, and in FIGS. 9 and 10 the circuit block 56 of FIG. 2, as they appear in their original condition prior to their modification, as hereinafter described, for adaptation to the particular panel assembly of FIG. 2. The standard circuit blocks are provided for mounting between standard valve mounting panel blocks and between a power entry block and a valve mounting panel block, to allow the panel block circuit designer the option of directing fluid flow in different ones of a wide variety of ways from block to block depending upon the desired circuitry of the fluid between and among the various valves to be mounted upon the valve mounting blocks of the panel, as hereinafter described in detail.

Circuit blocks 54 and 56, as shown in FIGS. 7 and 8, and in FIGS. 9 and 10, respectively, are each provided with a plurality of drill points 103, 104, 105 and 106 spaced along side 64 of the block, and drill points 107, 108, 109 and 110 spaced along side 65 of the circuit block. It is significant and important to note that the drill points serve to locate the alignment positions of the various valve communicating passages in the adjacent valve panel blocks 53 and 55, in that the spacing between the drill points on both sides of the block and the spacing between each drill point and passages 66, 67 and 68 is the same as the spacing between the valve communicating passages and the passages 66, 67, 68 of the valve mounting blocks 53 and 55, as hereinbefore described. This concept of spacing the valve communicating passages in the valve blocks 53 and 55, identically with the spacing between drill points on the circuit blocks 54, 56 provides and assures that each valve communicating passage of any standard valve panel block will be aligned with a drill point on any standard circuit block when any standard circuit block and any standard valve-mounting block are disposed in tandem side-by-side relationship.

The purpose of circuit block 54 is to connect the valve passages of the valve-mounting block disposed on either side of the circuit block with any valve passage on the valve panel disposed on the other side of the circuit block, or with either the pressure passage 67, or the return passage 68 of the panel system. This is achieved by providing an internal passage 114 extending from end 62 to end 63. The passage 114 is thus disposed to intersect and connect the pressure passage 67 and the tank passage 68 and is disposed perpendicularly to the axis of each drill point 103–110. Suitable removable plug means 115, which may be of the screw-threaded type, are fitted in passage 114 near the ends of block 54 to seal off circuit passage 114 from the tank pressure passage 68 and the pressure passage 67. Thus, at the option of the panel designer, the circuit between panel blocks may be established, as desired, to flow through any two passage openings of the adjacent valve mounting blocks by using a selected combination of plugs 115 and by drilling at selected drill points to provide an aperture or apertures communicating with the circuit passage 114. Inasmuch as the drill points premark and locate the valve communicating passages in the adjacent valve-mounting panel blocks, as previously described, no fixture is required to locate the holes and, accordingly modification of the circuit block to accommodate a particular direction of fluid flow through the circuit block may proceed rapidly requiring only a minimum expenditure of time and without requiring the effort of skilled labor. Additional plugs 115 are removably disposed in passage 114 of the ends 62, 63 of circuit block 54 to provide for power take-off connection with the pressure passage 67 and the tank passage 68.

The purpose of circuit block 56 is to isolate the pressure passage 67 from the tank passage 68 within the block so that two separate lines may be provided for connection to different valve passages in an adjacent valve mounting panel block. This is achieved by providing a pair of axially aligned passages 116, 117 extending lengthwise of the block, with passage 116 beginning near the midpoint of the block and extending lengthwise of the circuit block through passage 67 to the end of the block and with passage 117 beginning near the midpoint of the block and extending through tank passage 68 to the other end of the block. Removable plug means 115 are provided at the ends of the block and at the intersections between the passages 116, 117 and the passages 67, 68, respectively, thus serving to isolate the respective passages 116, 117 from passages 67, 68 respectively. This structure allows the panel designer to provide by judicious selection of plugs and drilling operations at preselected ones of the drill points to provide isolated flow of pressure and return flow through different valve passages of a single block on either or both sides of the circuit block.

Utilizing the above-described panel block elements, a panel designer can easily design a panel assembly in accordance with substantially any prescribed fluid circuit by selecting the standard types of valve panel blocks to correspond with the valves in the circuit, selecting the appropriate standard circuit blocks and drilling the same at preselected drill points thereon to provide the desired circuit relationship between valve panel blocks, and assembling the blocks in tandem relationship, thus providing internally in a single panel assembly all the piping required to interconnect the fluid valves to be mounted upon the valve blocks.

In constructing the specific panel assembly of FIG. 2 to accommodate the fluid circuit of FIG. 1, a standard valve block 55 is selected for mounting on the face 60 thereof the four-way directional valve 12 of FIG. 1 with valve ports 21, 22, 23 and 24 hereof connected to holes 93, 92, 94 and 95, respectively, of block 55. A panel block 53 is selected for mounting on the face thereof the regulating valve 13, with valve port connections 37, 38 thereof connected to holes 91, 90, respectively. A power entry block 57 is selected and provided with suitable fittings 118 for connecting drain passage 66 to the tank 15, for connecting pressure passage 67 to the remote pump 17, and for connecting the tank passage 68 to the remote tank 15.

Inasmuch as the circuit of FIG. 1 shows pump 17 connected to valve port 21 of valve 12, and valve port 24 connected to tank port 15, circuit block 56 of FIGS. 9 and 10 is selected and drilled at drill points 104 and 106, resulting in the internal passage structure of block 56 of FIG. 2. This drilling operation of point 104 connects pressure passage 67 through hole 93 to valve port 21 by the joining of passages 116 of the circuit block with passage 84 of the valve panel block 55. The drilling operation at point 106 connects passage 86 to passage 117 and tank passage 68, thus connecting valve port 24 with the remote tank 15.

Inasmuch as the circuit of FIG. 1 shows the port 22 of valve 20 connected to port 37 of regulating valve 13, a standard circuit block 54 of FIGS. 7 and 8 is selected and drilled at drill points 105 and 107, resulting in the passage structure shown in block 54 in FIG. 2, and connecting port 22, to port 37 through hole 92, passage 83, passage 114, passage 82 and hole 91. Port 38 of valve 13 is adapted for connection to port 41 of the remote cylinder 14 by means of a fitting 120 in hole 90 on the rear face 61 of panel block 53.

Inasmuch as the port 42 of cylinder 14 is shown in FIG. 1 as connected to port 23 of valve 20, a suitable fitting 121 is provided in hole 94 on the rear face 61 of valve block 55 for connection to suitable external piping leading to connection 42 of cylinder 14. A suitable fitting 111 is provided in pilot pressure hole 100 on rear face 61 of block 55 for receiving pilot pressure input. The end cap block 52 is provided to cap the assembly at the upper end. Suitable pipe plugs 112 are provided in holes 92, 93 and 95 on the rear face 61 of block 53, and in hole 90 on the rear face 61 of block 53.

In order to relatively locate the individual blocks of a panel assembly, suitable dowling pins 121 and apertures 122 such as shown on block 56, are provided, as desired, on the sides 63, 64 of all the individual blocks for mating relationship when the blocks are assembled as a panel. For convenience of illustration in FIG. 2, the pins 121 and apertures 122 are shown between panel blocks 55, 56 and 57 only.

The blocks of a panel assembly are held in fluid tight relationship after stacking by means of tie rods 119 extending the full length of the panel assembly through the pressure passage 67 and the tank or return passage 68, in conjunction with cap fittings 124 on the ends of the rods, and in conjunction with O-rings 129 disposed in suitable apertures 130 in gasket plates 131 disposed between adjacent blocks. The diameter of the pressure passage 67 and the tank passage 68 are sufficiently large to accommodate the tie rod as well as the amount of fluid commensurate to the operation of the system.

The valve mounting panel blocks 53 and 55, as hereinbefore described, exemplify to those skilled in the art a wide variety of standardized valve mounting blocks which may be constructed to mount different types of commercially available valve devices. It is apparent from the foregoing descripton that so long as the main passages and valve communicating passages of the valve mounting panel block terminate at different ones of prescribed locations along the sides of the block to thus correspond in location to the drill points on the circuit blocks, any valve mounting panel block is compatible with the hereinbefore described panel block system.

In order to mount the assembled panel upon a suitable support, there are provided suitable apertures 132 extending through each valve mounting panel block 53 and 55.

The panel blocks of the present invention are intended for use primarily in fluid systems of the hydraulic type, and, accordingly, the individual blocks include a separate drain channel 66 to provide a common drain channel extending through the panel assembly to facilitate draining of the various valve devices to prevent hydraulic lock within the valve devices as is well known in the hydraulic art. However, the panel blocks are equally suitable for use in pneumatic systems, in which event the drain passages 66 would remain unused inasmuch as pneumatic valves do not require a drain system and thus do not include drain ports. If desired, the panel blocks may be specifically adapted to pneumatic systems by merely omitting the drain passage during construction and thus reducing production costs.

From the foregoing, it is seen that there has been provided a panel assembly comprised of a plurality of different types of standardized valve mounting blocks interspersed with a plurality of different types of standardized circuit blocks wherein with minimum modification of the circuit blocks, different ones of the panel blocks may be assembled in tandem relationship to provide internal passageways for connecting together in substantially any circuit relationship the different valve means to be mounted upon the panel blocks.

It will be understood that various changes in the details and arrangement of parts, which have been herein disclosed and illustrated in order to explain the nature of the invention, may be made by those skilled in the art without departing from the spirit and scope of the invention as expressed in the appended claims.

Having now described the invention, what I claim as new and desire to secure by Letters Patent, is:

1. The method of directing fluid flow through at least one valve mounting panel block to a device to be operated, wherein the individual panel blocks include a plurality of passages therein, each passage terminating at each side of the block at an opening spaced from the other openings a predetermined fixed amount, comprising: providing additional passage means in each valve mounting block, said passage means extending from one side to the other and communicating with one surface of the block to form as a group a valve subplate, the number of additional passages being determined by the number of ports on the valve to be mounted on the individual block; said additional passages opening at both ends at the respective side, each opening corresponding with any one of a predetermined number of specifically located positions spaced along one side; providing a circuit block having parallel sides and having a plurality of main passages therein extending from side to side terminating in openings having the same spacing as the openings in the sides of the valve mounting panel blocks, each circuit block having a plurality of drilled recesses spaced along said sides at prescribed points corresponding in spacing to the location of the said additional passages, providing a passage means in said circuit block extending transversely of all of said drilled recesses and connecting with said main passages, drilling into said passage means at selected ones of said drilled recesses to interconnect the additional passages in the adjacent blocks, selectively blocking said passage means with respect to the main passage means depending upon the desired circuitry between valve mounting blocks, and disposing said mounting panel blocks and circuit blocks in tandem fluid tight relationship to provide communication between the valve ports in accordance with the prescribed circuitry.

2. The method of directing fluid flow from one valve mounting panel block to another, comprising: providing in each valve mounting panel block a plurality of passages each having an opening in one face of the block for mating with one of the ports of a valve to be mounted thereon, and each passage extending through the block from one side to the other, providing for disposition in side-by-side relationship with and between the panel blocks a circuit block having closed passage means therein extending transversely of openings in the sides of the panel blocks when the circuit block is so disposed therewith, selectively providing openings in the circuit block to communicate with said closed passage means at predetermined points aligned with said openings in the sides of the valve mounting panel blocks, the selective provision of openings depending upon the desired fluid flow from passage to passages in the panel blocks, and disposing said circuit block in fluid tight side-by-side relationship between said valve mounting blocks with the openings in the circuit blocks aligning with the openings in the sides of the adjacent panel blocks.

3. In a fluid distribution panel, a pair of valve mounting blocks each having a plurality of spaced main passages extending therethrough from one side to the other side in alignment with the main passages of the other, a plurality of holes on a face of each block, said holes spaced to individually mate with the ports of a valve to be mounted, on said face, a plurity of additional spaced passages extending through the block from said one side to said other side, each additional passage communicating with one of said holes internally of the corresponding block, a circuit block disposed between said pair of blocks in side-by-side fluid tight relationship therewith, passage means in said circuit block extending transversely of said additional passage means and having openings in the sides of the circuit block communicating with the passage means in the circuit block, said openings registering with predetermined ones of said additional passages in each of said pair of valve mounting blocks.

4. A fluid distribution panel, comprising: a pair of valve mounting blocks each having at least a pressure passage and a tank passage extending therethrough from one side to the other in alignment with the main passages of the others, a plurality of holes on a face of each block, said holes spaced to individually mate with the ports of a valve to be mounted on the face, a plurality of additional spaced passages extending through each block from said one side to the other, each additional passage communicating with one of said holes internally of the corresponding block, a first circuit block disposed between said pair of blocks in side-by-side relationship therewith having passage means therein extending transversely of said additional passage means and having openings in the sides of the circuit block communicating with said passage means in the circuit block, said openings registering with predeterminted ones of said additional passages in said pair of valve mounting blocks, a power entry block having a pressure passage and a tank passage extending therethrough from one side to the other in alignment with the pressure passage and tank passage of the valve mounting blocks, a second circuit block disposed in side-by-side relationship between one of said pair of valve mounting blocks and said power entry block, said second circuit block having a pressure passage and a tank passage therein in alignment with the corresponding passages in said power entry block and including passage means extending transversely of the additional passage means in the adajcent valve mounting block, said passage means in said second circuit block intersecting said pressure passage and said tank passage and tapped at the side in alignment with predetermined ones of said additional passage means in said one valve mounting block, an end block capping the openings in the side of the other of said pair of valve mounting blocks opposite the side adjacent said first circuit block, and means securing all the said blocks in fluid tight relationship.

5. A fluid distribution mounting panel, comprising: a plurality of panel blocks contiguously disposed and secured in side-by-side relationship, each block having parallel main passages extending therethrough from one side to the opposite side in alignment with the main passages of the others to form a common pressure passage, a common drain passage, and a common tank passage extending through the panel; alternate ones of said blocks comprising valve mounting blocks each having holes therein for mating with ports of a valve device to be disposed thereon and having additional internal passage means each communicating with one of said holes and extending through the block from said one side to said opposite side in parallel relationship with each other and said passages; each block between said alternate blocks comprising a circuit block including additional passage means therein extending transversely of the axes of the additional passages in the adjacent valve mounting blocks, said transverse passage means being tapped at one side of said circuit block coaxially with a predetermined one of said additional passage means in the valve mounting block on said one side and being tapped on the other side of said circuit block in coaxial relationship with one of the additional passages of the valve mounting block on said other side; and, at least one end block of said plurality of blocks comprising a circuit block having passage means therein extending transversely of the axes of the additional passage means in the adjacent valve mounting block and intersecting said main passages in the circuit block, said end block being tapped at one side coaxially with predetermined ones of said additional passage means in the adjacent valve mounting block for interconnecting the main passages with the additional passages in said adjacent valve mounting block.

6. The valve mounting panel of claim 5, and further characterized in that the spacing between main passage openings on one side of each block are identical to the spacing between the main passage openings on the other side of each block, and in that the spacing between the centers of each additional passage with respect to each other and with respect to the main passage openings are multiples of a predetermined distance.

7. The valve mounting panel of claim 6, and further characterized in that the passages and the additional passages are located at preselected ones of a plurality of drill points spaced identically along each side of each block.

8. The valve mounting panel of claim 5, and further characterized in that the transverse passage means extending through each said circuit block and said end block intersects the main passages, and, wherein removable plug means are disposed for selectively blocking communication between the main passages and the transverse passage means.

References Cited in the file of this patent

UNITED STATES PATENTS

| | | |
|---|---|---|
| 2,295,111 | Hemmings | Sept. 8, 1942 |
| 2,495,395 | Tweedale | Jan. 24, 1950 |
| 2,792,021 | Greeley | May 14, 1957 |
| 2,834,368 | Gray | May 13, 1958 |
| 2,849,986 | Klopp | Sept. 2, 1958 |
| 2,855,947 | Lee | Oct. 14, 1958 |
| 3,025,878 | Hupp | Mar. 20, 1962 |
| 3,029,830 | Klover et al. | Apr. 17, 1962 |

FOREIGN PATENTS

| | | |
|---|---|---|
| 548,175 | Great Britain | Sept. 29, 1942 |
| 1,220,601 | France | Jan. 4, 1960 |